(12) United States Patent
Poustchi et al.

(10) Patent No.: US 12,493,506 B2
(45) Date of Patent: *Dec. 9, 2025

(54) METHOD OF DETECTING FAULTS IN A FAULT TOLERANT DISTRIBUTED COMPUTING NETWORK SYSTEM

(71) Applicant: AKIMBO TECHNOLOGIES INC., North Vancouver (CA)

(72) Inventors: Behrouz Poustchi, North Vancouver (CA); Brandon Grimshaw, Vancouver (CA)

(73) Assignee: Akimbo Technologies Inc., North Vancouver (CA)

( * ) Notice: Subject to any disclaimer, the term of this patent is extended or adjusted under 35 U.S.C. 154(b) by 368 days.

This patent is subject to a terminal disclaimer.

(21) Appl. No.: 18/100,954

(22) Filed: Jan. 24, 2023

(65) Prior Publication Data

US 2023/0350742 A1 Nov. 2, 2023

Related U.S. Application Data

(63) Continuation of application No. 16/096,484, filed as application No. PCT/IB2017/052426 on Apr. 26, 2017, now Pat. No. 11,567,818.

(Continued)

(51) Int. Cl.
*G06F 11/00* (2006.01)
*G06F 11/07* (2006.01)
(Continued)

(52) U.S. Cl.
CPC ........ *G06F 11/076* (2013.01); *G06F 11/0709* (2013.01); *G06F 11/0796* (2013.01); *G06F 21/64* (2013.01); *H04L 41/0677* (2013.01); *H04L 43/0823* (2013.01); *H04L 67/10* (2013.01); *H04L 67/1044* (2013.01); *H04L 69/40* (2013.01); *H04L 43/16* (2013.01)

(58) Field of Classification Search
CPC . G06F 11/076; G06F 11/0709; G06F 11/0796
See application file for complete search history.

(56) References Cited

U.S. PATENT DOCUMENTS 7,533,184 B2 * 5/2009 Miller ................. H04L 61/4541
709/236
7,610,505 B2 * 10/2009 Datta ..................... H04L 63/14
709/224

(Continued)

*Primary Examiner* — Amine Riad

(57) ABSTRACT

Methods, systems, and techniques for detecting faults in a distributed computing network system. The system hosts and executes an application with a plurality of datasets, and includes a plurality of peer computing devices and management services. A receiving peer computing device receives a message that includes a first copy of a dataset from a sending peer computing device. It is determined whether a mismatch exists among the first copy of the dataset, a second copy of the dataset stored at the receiving peer computing device, and a third copy of the dataset stored at a third peer computing device having authority over the dataset. If so, a correction to the second copy of the dataset is performed or a fault message is sent to management services indicating that a fault has been detected at the receiving peer computing device.

16 Claims, 12 Drawing Sheets

Related U.S. Application Data

(60) Provisional application No. 62/456,867, filed on Feb. 9, 2017, provisional application No. 62/327,684, filed on Apr. 26, 2016.

(51) Int. Cl.

| | | |
|---|---|---|
| *G06F 21/64* | (2013.01) | |
| *H04L 41/0677* | (2022.01) | |
| *H04L 43/0823* | (2022.01) | |
| *H04L 67/10* | (2022.01) | |
| *H04L 67/104* | (2022.01) | |
| *H04L 69/40* | (2022.01) | |
| *H04L 43/16* | (2022.01) | |

(56) References Cited

U.S. PATENT DOCUMENTS

| | | | |
|---|---|---|---|
| 8,037,202 B2 * | 10/2011 | Yeager | H04L 67/34 709/224 |
| 8,683,551 B2 * | 3/2014 | Pierer | H04L 67/1093 709/219 |
| 9,386,091 B2 * | 7/2016 | Parker | H04L 67/1057 |
| 9,529,923 B1 | 12/2016 | Baird, III | |
| 2005/0086300 A1 * | 4/2005 | Yeager | H04L 69/329 709/204 |
| 2005/0086350 A1 | 4/2005 | Mai | |
| 2006/0077952 A1 * | 4/2006 | Kubsch | H04L 67/1044 370/351 |
| 2007/0192321 A1 | 8/2007 | Farr et al. | |
| 2009/0119747 A1 * | 5/2009 | Pierer | H04L 67/104 726/1 |
| 2011/0185031 A1 * | 7/2011 | Massoulie | H04L 9/40 709/212 |
| 2016/0044649 A1 * | 2/2016 | Frenne | H04W 72/20 370/329 |
| 2016/0294940 A1 * | 10/2016 | Ma | H04L 67/1078 |
| 2017/0310747 A1 * | 10/2017 | Cohn | H04W 4/70 |
| 2019/0036895 A1 * | 1/2019 | Irvine | H04L 9/3239 |

* cited by examiner

Figure 11

Players, AI Actors and players without authority

| Peer Index | AP1 | AP2 | AP3 | AP4 | AP5 | AP6 | AI1 | AI2 | AI3 | AI4 | AP7 | AP8 |
|---|---|---|---|---|---|---|---|---|---|---|---|---|
|  | 1 | 2 | 3 | 4 | 5 | 6 | 7 | 8 | 9 | 10 | 11 | 12 |
| P1 | ✓ | ✓ | ✓ | ✓ |  |  |  |  |  |  |  |  |
| P2 |  | ✓ | ✓ | ✓ | ✓ | ✓ |  |  |  |  |  |  |
| P3 |  |  |  | ✓ |  |  |  |  | ✓ | ✓ |  |  |
| P4 | ✓ |  |  |  |  |  |  |  | ✓ | ✓ | ✓ |  |
| P5 | ✓ | ✓ |  |  |  |  | ✓ | ✓ | ✓ |  | ✓ | ✓ |
| P6 | ✓ | ✓ | ✓ |  |  |  | ✓ | ✓ | ✓ |  |  | ✓ |

Peers with Authority authorityArray [4, 1] ; authorityArray [5, 1] ; authorityArray [6, 1]
authorityArray [5, 2] ; authorityArray [6, 2] ; authorityArray [1, 2]

authorityArray [6, 3] ; authorityArray [1, 3] ; authorityArray [2, 3]
authorityArray [1, 4] ; authorityArray [2, 4] ; authorityArray [3, 4]

authorityArray [2, 11] ; authorityArray [3, 11] ; authorityArray [4, 11]
authorityArray [3, 12] ; authorityArray [4, 12] ; authorityArray [5, 12]

1100

METHOD OF DETECTING FAULTS IN A FAULT TOLERANT DISTRIBUTED COMPUTING NETWORK SYSTEM

CROSS-REFERENCE TO RELATED APPLICATIONS

This application is a continuation of U.S. patent application Ser. No. 16/096,484 filed Apr. 26, 2017 (now issued as U.S. Pat. No. 11,567,818), which claims priority to U.S. provisional application 62/327,684, filed Apr. 26, 2016, and U.S. provisional application 62/456,867 filed Feb. 9, 2017, which are incorporated herein by reference.

FIELD

The present invention relates to distributed computing. More particularly, the present invention relates to a distributed computing network method for detecting faults in a fault tolerant distributed computing network system.

BACKGROUND

Peer-hosted networks are known. In peer-hosted networks, multiple peers each run a simulation of a software application, such as for example, an online game application, and each peer communicates with a centralized data store that stores all of the data associated with each data set of software application. A peer-hosted network with a centralized data store at one of the peers is known as a single authority peer hosted network. A single authority peer-hosted network is an example of a client-server system, where one peer is the host of the software application. Single authority exists for all data sets of the software application.

Peer-to-peer networks are also known. Peer-to-peer networks include multiple peers in which each peer is running a software application, such as an online game application, and each peer stores or maintains duplicates the data of the software application. Each peer communicates with a centralized data authority for all the data associated with each data set of the software application. In a peer-to-peer network, one peer hosts the master game data, and all other peers have copies of the game data. On such a network, there is a single authority for the game data.

A limitation of known peer-hosted networks and peer-to-peer networks is authority for the data of the software application is centralized, which leaves these networks vulnerable to disruption by bad peers (e.g. a peer that is being hacked or sending corrupt data over the network, or being corrupted in the network), and leaves the data vulnerable to hacking or cheating.

SUMMARY

According to an aspect of an implementation, the present disclosure provides a method for detecting faults in a distributed computing network system hosting and executing an application comprising a plurality of data sets. The distributed computing network system comprising a plurality of peer computing devices and management services, wherein each peer computing device communicates with other peer computing devices in the distributed computing network system via communication links, wherein the plurality of the peer computing devices execute computer-readable instructions of the application. The method includes, at a first peer computing device of the plurality of peer computing devices of the distributed computing network system: receiving, from the management services, authority information and storing in memory the authority information, the authority information identifying each respective peer computing device of the distributed computing network system, and for each receptive peer computing device, which ones of the plurality of datasets the respective peer computing device has authority over; receiving a first message comprising a first instance of a data set, a second message comprising a second instance of the data set, and third message comprising a third instance of the data set, wherein the second message is received from a second peer computing device of the plurality of peer computing devices, and the third message received from a third peer computing device of the plurality of peer computing devices; in response to determining, using the authority information, that each of the first peer computing device, the second peer computing device, and the third peer computing device has authority over the dataset, determining whether the first instance of the dataset, the second instance of the dataset, and the third instance of the dataset match; and, in response to determining that the first instance of the dataset, the second instance of the dataset, and the third instance of the dataset do not match, sending, to the management server, a fault message indicating that a fault has been detected at the first peer computing device.

According to another aspect of an implementation, the present disclosure provides a method for detecting faults in a distributed computing network system hosting and executing an application comprising a plurality of data sets. The distributed computing network system comprising a plurality of peer computing devices and management server, wherein each peer computing device communicates with other peer computing devices in the distributed computing network system via communication links, wherein the plurality of the peer computing devices execute computer-readable instructions of the application. The method includes: at a first peer computing device of the plurality of peer computing devices of the distributed computing network system: receiving, from the management server, authority information and storing in memory the authority information, the authority information identifying each respective peer computing devices of the distributed computing network system, and for each receptive peer computing device, which ones of the plurality of datasets the respective peer computing device has been assigned authority over; receiving a first message comprising a first instance of a dataset and a second message comprising a second instance of the dataset, wherein the first message is received from the first peer computing device or another peer computing device of the plurality of peer computing devices, wherein the second message is received from a second peer computing device of the plurality of peer computing devices; in response to determining, using the authority information, that the first peer computing device and the second peer computing device have authority over the data set, determining whether the first instance of the dataset matches the second instance of the dataset; and, in response to determining that the first instance of the dataset does not match the second instance of the dataset, sending, to the management server, a fault message indicating that a fault has been detected at the first peer computing device.

According to another aspect of an implementation, the present disclosure provides a method of detecting faults of a distributed computing network system running an application, the distributed computing network system comprising peer computing devices and management services storing authority information identifying each respective peer computing device of the distributed computing network system, and for each receptive peer computing device, which ones of the plurality of data sets the respective peer computing device has authority over, the method comprising; receiving, from least two peer computing devices of peer authority group, a fault message comprising all instances of a dataset received at the peer computing device; identify which of the at least two the peer computing devices of the authority group has a fault; incrementing a fault counter for the identified peer computing device; when the said faulty peer counter for the identified peer computing device exceeds a threshold: updating the authority information stored in the management services to change the authority of the identified peer computing device over the dataset; and sending to all peer computing devices in the distributed computing network system the new authority information.

According to another aspect of an implementation, the present disclosure provides a method of detecting faults of a distributed computing network system running an application, the distributed computing network system comprising peer computing devices and management services storing authority information identifying each respective peer computing device of the distributed computing network system, and for each receptive peer computing device, which ones of the plurality of data sets the respective peer computing device has authority over, the method comprising: receiving, from a peer computing device of peer authority group, a fault message comprising all instances of a dataset received at the peer computing device; incrementing a fault counter for the peer computing device; when the said faulty peer counter for the peer computing device exceeds a threshold: updating the authority information stored in the management services to change the authority of the peer computing device over the dataset; and sending to all peer computing devices in the distributed computing network system the new authority information.

The distributed computing network system and method of the present disclosure ensure that data in the distributed computing network system is managed by multiple checks of authority, thus maintaining data authority redundancy, and mitigating the effects of data faults and data tampering.

BRIEF DESCRIPTION OF THE FIGURES

Embodiments of the present disclosure will be described, by way of example, with reference to the drawings and to the following description, in which:

FIG. 11 is a diagram of an authority map for a fault tolerant distributed computing network system in accordance with a non-limiting implementation;

DETAILED DESCRIPTION

Figure 1:
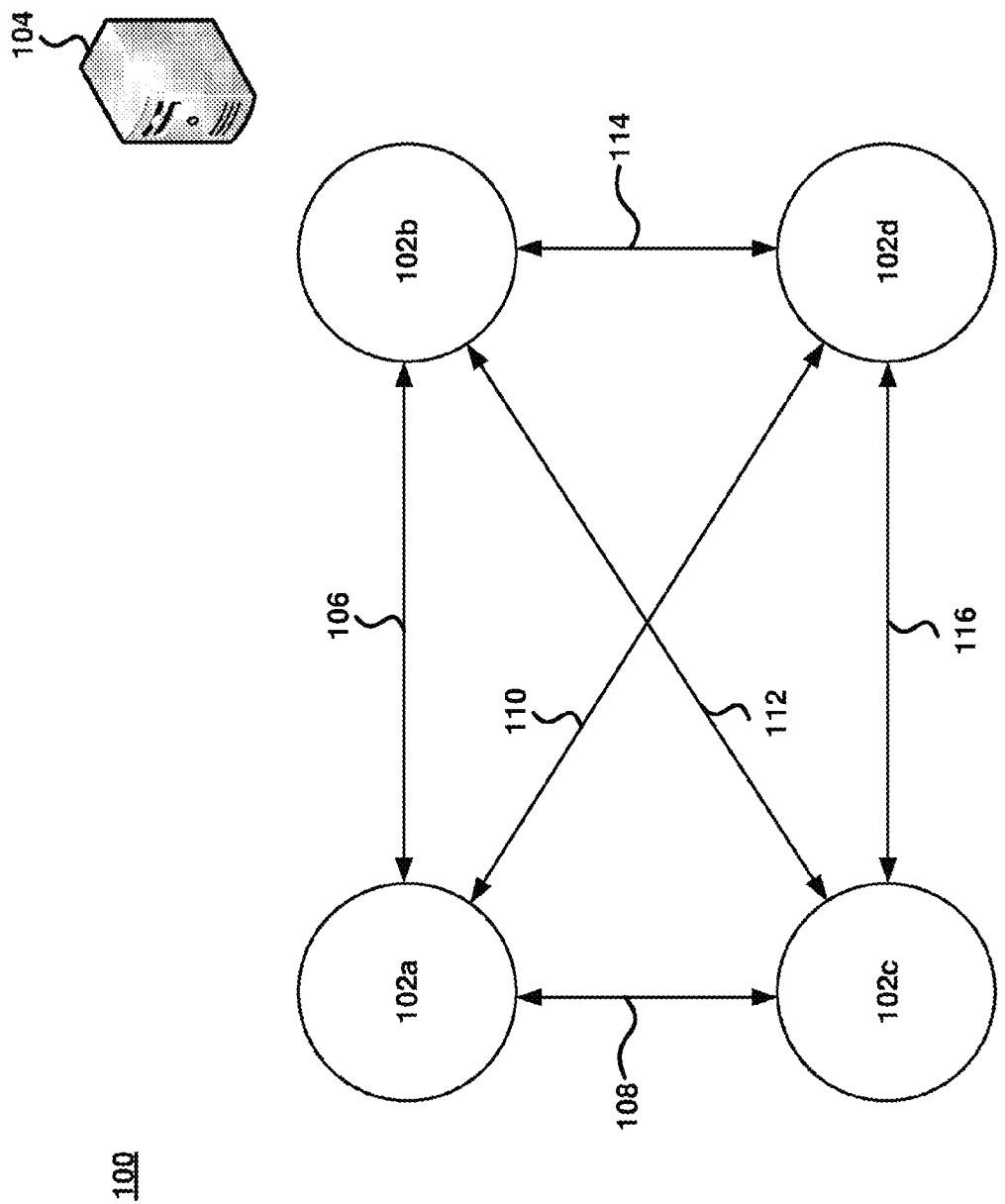
FIG. 1 is a block diagram of a distributed computing network system in accordance with a non-limiting implementation.

In this disclosure, elements may be described as "configured to" perform one or more functions or "configured for" such functions. In general, an element that is configured to perform or configured for performing a function is enabled to perform the function, or is suitable for performing the function, or is adapted to perform the function, or is operable to perform the function, or is otherwise capable of performing the function.

It is understood that for the purpose of this disclosure, language of "at least one of X, Y, and Z" and "one or more of X, Y and Z" can be construed as X only, Y only, Z only, or any combination of two or more items X, Y, and Z (e.g., XYZ, XY, YZ, ZZ, and the like). Similar logic can be applied for two or more items in any occurrence of "at least one . . . " and "one or more . . . " language.

It is also understood that for the purpose of this disclosure, a dataset is a named collection of related data that includes individual data units. A dataset is organized into a data structure. It will also be understood for the purposes of the present disclosure that a peer authority group is a group of peer computing devices that have been assigned authority over a dataset. It will also be understood that the term peer computing device is also known as a peer by persons of ordinary skill in the art.

For simplicity and clarity of illustration, reference numerals may be repeated among the figures to indicate corresponding or analogous elements. Numerous details are set forth to provide an understanding of the implementations described herein. The implementations may be practiced without these details. In other instances, well-known methods, procedures, and components have not been described in detail to avoid obscuring the implementations described. The specification is not to be considered as limited to the scope of the implementations described herein.

The present disclosure generally relates to a distributed computing network system running a distributed software program or application, and a method of detecting faults in the distributed computing network system.

FIG. 1 shows a block diagram of a distributed computing networked system 100 (referred to hereinafter as system 100) according to a non-limiting embodiment. System 100 comprises four peer computing devices 102a, 102b, 102c, and 102d (referred to hereinafter individually as peer computing device 102 and collectively as peer computing devices 102) and a management services 104 that includes authentication and authority management. Each peer computing device 102 can be any suitable type of computing device, such as for example, a desktop computer, a laptop computer, a gaming console, a smartphone, motor vehicle electronic control units, medical electronic control units, and the like. Other suitable devices are within the scope of present implementations.

Peer computing device 102a can communicate with peer computing device 102b via communication link 106. Peer computing device 102a can also communicate with peer computing device 102c via communication link 108, and peer computing device 102d via communication link 110. Peer computing device 102b can communicate with peer computing device 102a via communication link 106. Peer computing device 102b can also communicate with peer computing device 102c via communication link 112, and can communicate with peer computing device 102d via communication link 114. Peer computing device 102c can communicate with peer computing device 102a via communication link 108. Peer computing device 102c can also communicate with peer computing device 102b via communication link 112, and communicate with peer computing device 102d via communication link 116. Peer computing device 102d can communicate with peer computing device 102a via communication link 110. Peer computing device 102d can also communicate with peer computing device 102b via communication link 114, and can communicate with peer computing device 102c via communication link 116. In other words, the peer computing devices 102 in system 100 can communication with each other via communication links 106, 108, 110, 112, 114, and 116.

System 100 can run a distributed software program or application (referred to hereinafter as application) comprising a plurality of datasets. Each peer computing device 102 executes computer-readable instructions of the distributed software program or application.

Figure 2:
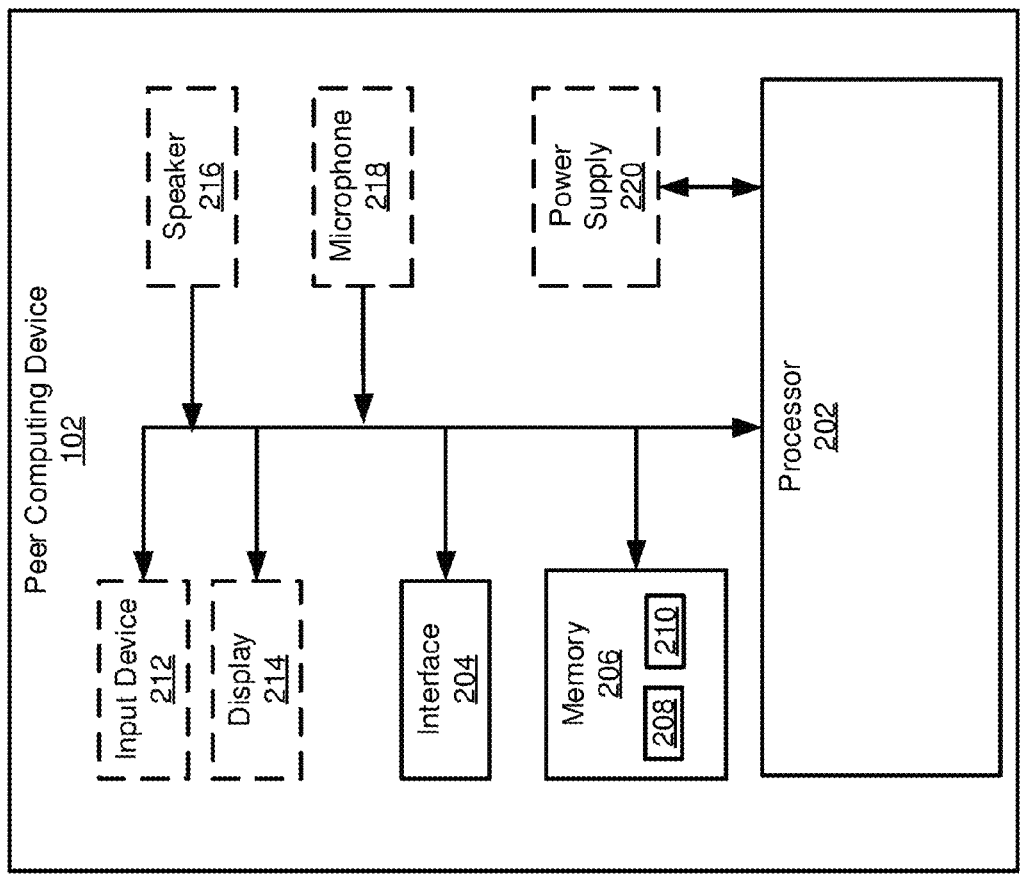
FIG. 2 is a block diagram of a peer computing device of the distributed computing network system of FIG. 1 in accordance with a non-limiting implementation.

Attention is now directed to FIG. 2, which shows a block diagram of a peer computing device 102. Peer computing device 102 includes a processor 202 that controls the overall operation of the peer computing device 102. Processor 202 is coupled to and interacts with other components of peer computing device 102, including a communication interface 204 (referred to hereinafter as interface 204), and memory 206. Processor 102 can be implemented as a plurality of processors, and/or as one or more DSPs (Digital Signal Processors) including but not limited to one or more central processors (CPUs)). Processor 102 is configured to communicate with memory 204 comprising a non-volatile storage unit (e.g. Erasable Electronic Programmable Read Only Memory ("EEPROM"), Flash Memory) and a volatile storage unit (e.g. random access memory ("RAM")). Programming instructions that implement the functional teachings of device 100 as described herein are typically maintained, persistently, in memory 106 and used by processor 202 which makes appropriate utilization of volatile storage during the execution of such programming instructions. Those skilled in the art will now recognize that memory 206 is an example of computer readable media that can store programming instructions executable on processor 202. Furthermore, memory 206 is also an example of a memory unit and/or memory device.

Peer computing device 102 also includes an operating system 208 and software programs or applications 210 that control operations of peer computing device 102. Operating system 208 and the software programs or applications 210 may be installed on the peer computing device 102 at manufacture. Alternatively, operating system 208 and software applications may be installed from a media device such as a disk or USB stick or downloaded from a server. Operating system 208 and the software programs and are typically stored in memory 206. Operating system 208 and the software programs or applications 210 are executed by processor 202. Those skilled in the art will appreciate that portions of operating system 208 and software programs or applications 210, such as specific peer computing device applications, or parts thereof, may be temporarily loaded into volatile storage unit of memory 206. Other software programs can also be included, as is well known to those skilled in the art.

Processor 202 of peer computing device 102 is also configured to execute computer-readable instructions of the distributed software program or application running on system 100.

Processor 202 is further configured to interact with communication interface 204 (referred to interchangeably as interface 204), which may be implemented as one or more radios and/or network adaptors and/or connectors to radios or network adaptors, configured to wirelessly communicate with one or more communication networks (not depicted). It will be appreciated that interface 204 is configured to correspond with the network architecture that is used to implement one or more communication links to the other peer computing devices 102 in system 100.

Peer computing device 102 can include other components, including an input device 212, a display 214, a speaker 216, a microphone 218, and a power supply 220 as shown in FIG. 2. Processor 202 can be coupled to and configured to interact with one or more of input device 212, display 214, speaker 216, microphone 218, and power supply 220.

Input device 212 is generally configured to receive input data, and can include any suitable combination of input devices, including but not limited to a keyboard, a keypad, a pointing device, a mouse, a track wheel, a trackball, a touchpad, a touchscreen, gas sensors, temperature sensors, position sensors, and the like.

Display 214, can comprises any suitable one of, or combination of, flat panel displays (e.g. LCD (liquid crystal display), plasma displays, OLED (organic light emitting diode) displays, touch-sensitive displays such as capacitive, resistive, infrared, surface acoustic wave (SAW), optical touchscreen displays, CRTs (cathode ray tubes) and the like.

Power supply 220 powers components of peer computing device 102 including, but not limited to processor 202, interface 204, memory 206, input device 212, display 214, speaker 216, microphone 218. Power supply 118 may include, a battery, a power pack and the like; however, in other implementations, power supply 118 may include a connection to a mains power supply and/or a power adaptor (e.g. and AC-to-DC (alternating current to direct current) adaptor).

Referring again to FIG. 1, management services 104 may reside on a server which includes a processor (not shown) that controls the overall operation of the components of the management services 104, including a network interface controller (not shown), and memory (not shown). Memory (not shown) of management services 104 includes both volatile storage, and non-volatile storage. The management services 104 is configured to communicate with each peer computing device 102 via a communication link (not shown).

The management services 104 is configured to authenticate users of a distributed software program or application running on system 100. The management services 104 is also configured to generate, manage, and maintain authority information for system 100, as described in further detail below. Management services 104 is configured to receive, from each respective peer computing device 102, messages indicative of major actions and errors detected at the respective peer computing device 102. In some implementations, the management services 104 may reside on a peer computing device 102 in the system 100 having authority over its plurality of datasets distributed across system 100 with multiple authority over each dataset.

Referring again to FIG. 1, in system 100, a plurality of datasets is distributed across all peers 102, and each peer computing device 102 has authority on one or more datasets. The authority for one dataset of the application is hosted on one or more peer computing devices 102, and a copy of the dataset is stored in memory 204 of each peer computing device 102 in system 100. Each peer computing device 102 in system 100 maintains in memory 204 a copy of the latest authority data of every other peer computing device 102 stored as non-authority data.

Each time authority data on a peer computing device 102 changes, all other peer computing devices 102 in system 100 receive, from the management services 104, new authority information. Each peer computing device 102, upon receipt of the new authority information, stores the new authority information in memory 206 by replacing the authority information in memory 206 with the new authority information. The peer 102 with authority over any particular dataset has authority to determine which copy of the dataset for which it has authority is correct.

Total authority of the application is achieved by the combination of all peer computing devices 102. For example, when system 100 is hosting a multiplayer game running on system 100, the authority data represents the authority data of the application. Authority data is a dataset that belong to a peer computing device with authority over that dataset.

In some implementations, management server 104 assigns authority over datasets such that none of the peer computing devices 102 of system 100 has authority over datasets associated with that peer 102. In other words, no peer 102 of system 100 has authority over its own data. In one implementation, peer 102a can have authority for dataset that is associated with peer 102b, peer 102b can have authority for dataset that is associated with peer 102c, peer 102c can have authority for dataset that is associated with peer 102d, and peer 102d can have authority for data associated with peer 102a. As an example, when the application is a multiplayer game application, the dataset associated with each respective peer computing device 102 may comprise data related to a player character, or other actors, controlled by the respective peer computing device 102. Arranging the authority in this way ensures that none of peer computing devices 102 has authority over its own player dataset, to reduce the vulnerability of the game to cheating by altering the its own player dataset. Although it is preferred that none of peer computing devices 102 has authority over its own dataset, in other implementations, authority is distributed across peer computing devices 102 by other rules as defined by the application designer.

Figure 3:
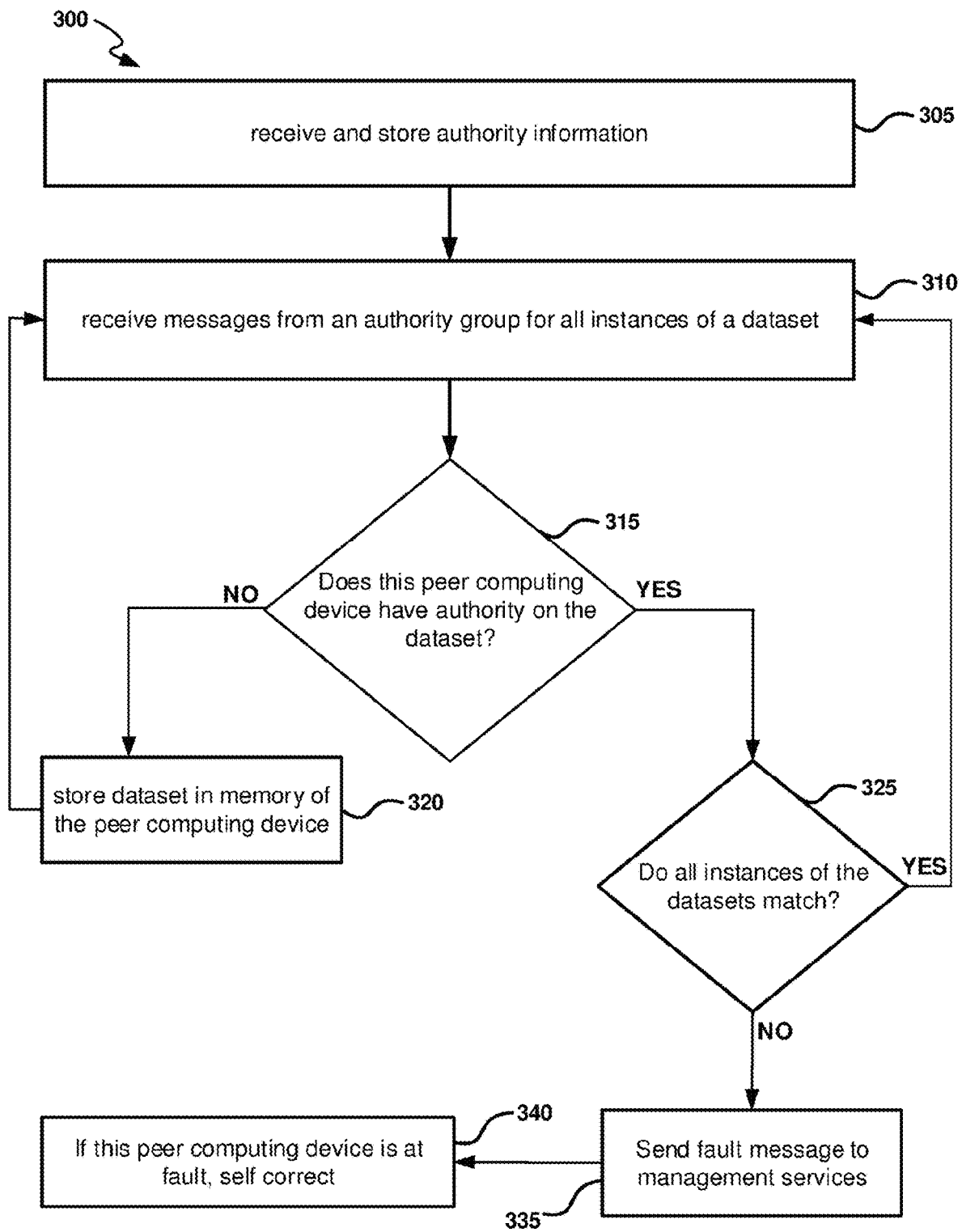
FIG. 3 is a schematic flow diagram of a method of detecting faults at a peer computing device in the distributed computing network system of FIG. 1, in accordance with a non-limiting implementation.

Reference is now made to FIG. 3 to describe an example implementation of a method 300 of detecting faults at a peer computing device 102 in system 100. In this example implementation, the management server 104 assigns authority for each dataset of the distributed software program or application running on system 100, and stores in memory (not shown), the assigned authority information, as described in further detail below. The authority information can be stored in memory (not shown) of the management services 104 in any suitable data structure, such as for example, a list, a table, or an array. The authority information identifies each peer computing device 102 in system 100, and for each respective peer computing device 102 in the system 100, which datasets of the application the respective peer computing device 102 has authority over.

After the management services 104 assigns authority for each dataset of the application, the management services 104 stores the authority information in memory, and sends the authority information to each peer computing device 102 of system 100. Each peer computing device 102 receives the authority information sent by the management services 104, and stores a copy of the authority information in memory 206. In other words, each peer 102 of the system 100 maintains a copy of the authority information received from the management services 104.

The authority information includes an authority map having peer authority groups associated with datasets of the application. A peer authority group is a group of peer computing devices 102 that have been assigned authority over a particular dataset of the application. In this implementation, each peer authority group includes three peer computing devices 102. This implementation is therefore referred to as a three authority model.

Method 300 may be carried out by routines or subroutines of software executed by the processor 202 of the peer computing devices 102a of system 100. Coding of software for carrying out such steps is well within the scope of a person of ordinary skilled in the art having regard to the present specification. Method 300 may contain additional or fewer processes than shown and described, and may be performed in a different order. Computer-readable code executable by, for example, processor 202 of peer computing device 102a to perform method 300, may be stored in a computer-readable medium.

Regardless, it is to be emphasized, that method 300 of FIG. 3 need not be performed in the exact sequence as shown, unless otherwise indicated; and likewise various blocks may be performed in parallel rather than in sequence; hence the elements of method 300 of FIG. 3 referred to herein as "blocks" rather than "steps". It is also to be understood that, every peer computing device 102 (e.g. 102b, 102c, 102d) in system 100 performs method 300 of FIG. 3.

Method 300 begins at block 305. At block 305, peer computing device 102a of system 100 receives, from management services 104, authority information, and stores, in memory 206, the received authority information. The method then proceeds to block 310.

At block 310, peer computing device 102a receives messages from an authority group for all instances of the dataset. In the present implementation, the peer authority group identifies three peer computing devices 102 that have authority over the dataset. Thus, at block 310, peer computing device 102a receives a first message from a first peer computing device 102 of the peer authority group, a second message from a second peer computing device 102 of the peer authority group, a third message, from a third peer computing device 102 of the peer authority group. The first message includes a first instance of the dataset, the second message includes a second instance of the dataset, and the third message that includes a third instance of data set. The first, second and third messages can be received simultaneously or at different times.

In some implementations the first message can also include a timestamp indicative of a time the first instance of the data set was generated at the first peer computing device 102 of the peer authority group. Similarly, the second message can also include a timestamp indicative of a time the second message was generated at the second peer computing device 102 of the peer authority group, and the third message can include a timestamp indicative of a time the third message was generated at the third peer computing device 102 of the peer authority group.

After peer computing device 102a receives messages from the peer authority group for all instances of the dataset, method 300 proceeds to block 315. At block 315, peer computing device 102a determines, using the authority information stored in memory 202, whether it has authority over the dataset.

If, at block 315 peer computing device 102a determines, using the authority information stored in memory 202, that it does not have authority over the dataset, method 300 proceeds to block 320. Otherwise, method 300 proceeds to block 325.

At block 320, peer computing device 102a stores an instance of the dataset in memory 202 and then returns to block 310. The instance of the dataset that is stored in memory 202 can be any one of the three instances of the dataset from peer computing devices 102 in the authority group, or an average of the three datasets.

At block 325, peer computing device 102 compares all the instances of the dataset that were received to determine whether all instances match. If all the instances of the dataset match, method 300 returns to block 310. Otherwise, method proceeds to block 335. At block 335, peer computing device 102a sends a fault message to the management services indicating that a fault occurred at peer computing device 102a. The fault message can also include the first, second, and third instances of the dataset. After sending a fault message at block 335, method 300 proceeds to block 340. At block 340, peer computing device 102a determines whether it is at fault Block 340 peer computing device 102a determines that it is at fault, peer computing device 102a self corrects by updating a local copy of the dataset stored in memory 202 of the peer computing device 102a with one of the instances of the dataset received at block 305.

Figure 4:
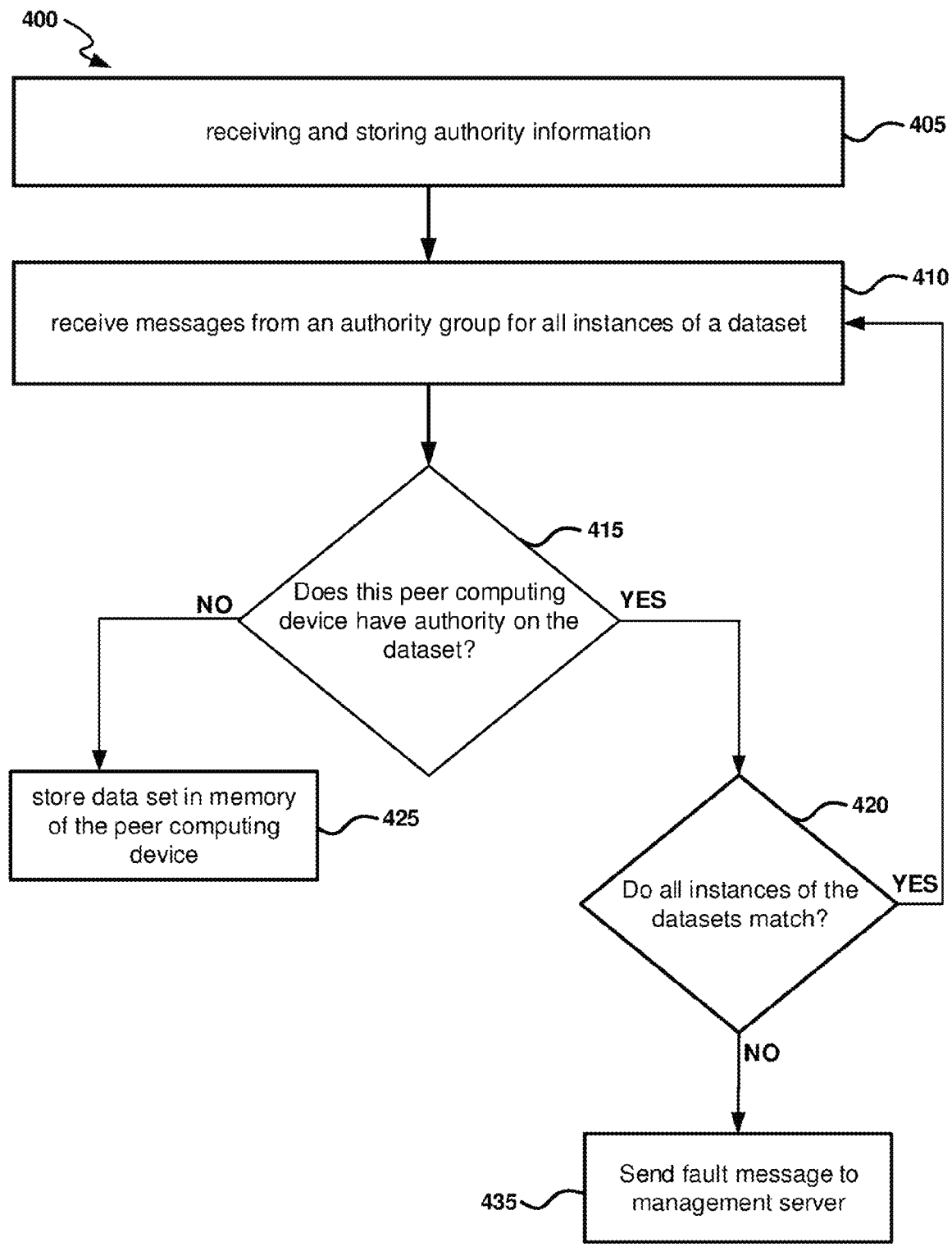
FIG. 4 is a schematic flow diagram of a method of detecting faults at a peer computing device in the distributed computing network system of FIG. 1, in accordance with another non-limiting implementation.

Reference is now made to FIG. 4 to describe an example implementation of a method 400 of detecting faults at a peer computing device 102 in system 100. As in method 300 described above, the method management server 104 assigns authority for each dataset of the distributed software program or application running on system 100, and stores in memory (not shown), the assigned authority information. The authority information identifies each peer computing device 102 in system 100, and for each respective peer computing device 102 in the system 100, which datasets of the application the respective peer computing device 102 has authority over.

The authority information includes an authority map having peer authority groups associated with datasets of the application. A peer authority group is a group of peer computing devices 102 that have been assigned authority over a particular dataset of the application. In this implementation, each peer authority group includes two peer computing devices 102. This implementation is therefore referred to as a two authority model.

Method 400 may be carried out by routines or subroutines of software executed by the processor 202 of the peer computing devices 102a of system 100. Coding of software for carrying out such steps is well within the scope of a person of ordinary skilled in the art having regard to the present specification. Method 400 may contain additional or fewer processes than shown and described, and may be performed in a different order. Computer-readable code executable by, for example, processor 202 of peer computing device 102a to perform method 400, may be stored in a computer-readable medium.

Regardless, it is to be emphasized, that method 400 of FIG. 4 need not be performed in the exact sequence as shown, unless otherwise indicated; and likewise various blocks may be performed in parallel rather than in sequence; hence the elements of method 400 of FIG. 4 referred to herein as "blocks" rather than "steps". It is also to be understood that, every peer computing device 102 (e.g. 102b, 102c,102d) in system 100 performs method 400 of FIG. 4.

Method 400 begins at block 405. At block 405, peer computing device 102a of system 100 receives, from management services 104, authority information, and stores, in memory 206, the received authority information. The method then proceeds to block 410.

At block 410, peer computing device 102a receives messages from an authority group for all instances of the dataset and then method 400 proceed to block 514. In the present implementation, the peer authority group identifies two peer computing devices 102 that have authority over the dataset. Thus, at block 310, peer computing device 102a receives a first message from a first peer computing device 102 of the peer authority group and a second message from a second peer computing device 102 of the peer authority group. The first message includes a first instance of the dataset and the second message includes a second instance of the dataset. The first and second messages can be received at peer computing device 102a at the time or times.

At block 415, peer computing device 102a determines, using the authority information stored in memory 202, whether it has authority over the dataset.

If, at block 415 peer computing device 102a determines, using the authority information stored in memory 202, that it does not have authority over the dataset, method 300 proceeds to block 420. Otherwise, method 400 proceeds to block 425.

At block 420, peer computing device 102a stores an instance of the dataset in memory 202 and then returns to block 410. The instance of the dataset that is stored in memory 202 can be any one of the second instance of the dataset received from the second peer computing device 102 of the authority group.

At block 425, peer computing device 102 compares all the instances of the dataset that were received to determine whether all instances match. If all the instances of the dataset match, method 400 returns to block 410. Otherwise, method proceeds to block 435. At block 435, peer computing device 102a sends a fault message to the management services 104. The fault message can include the first instance of the dataset and the second instance of the dataset for further validation by the management services 104.

Figure 5:
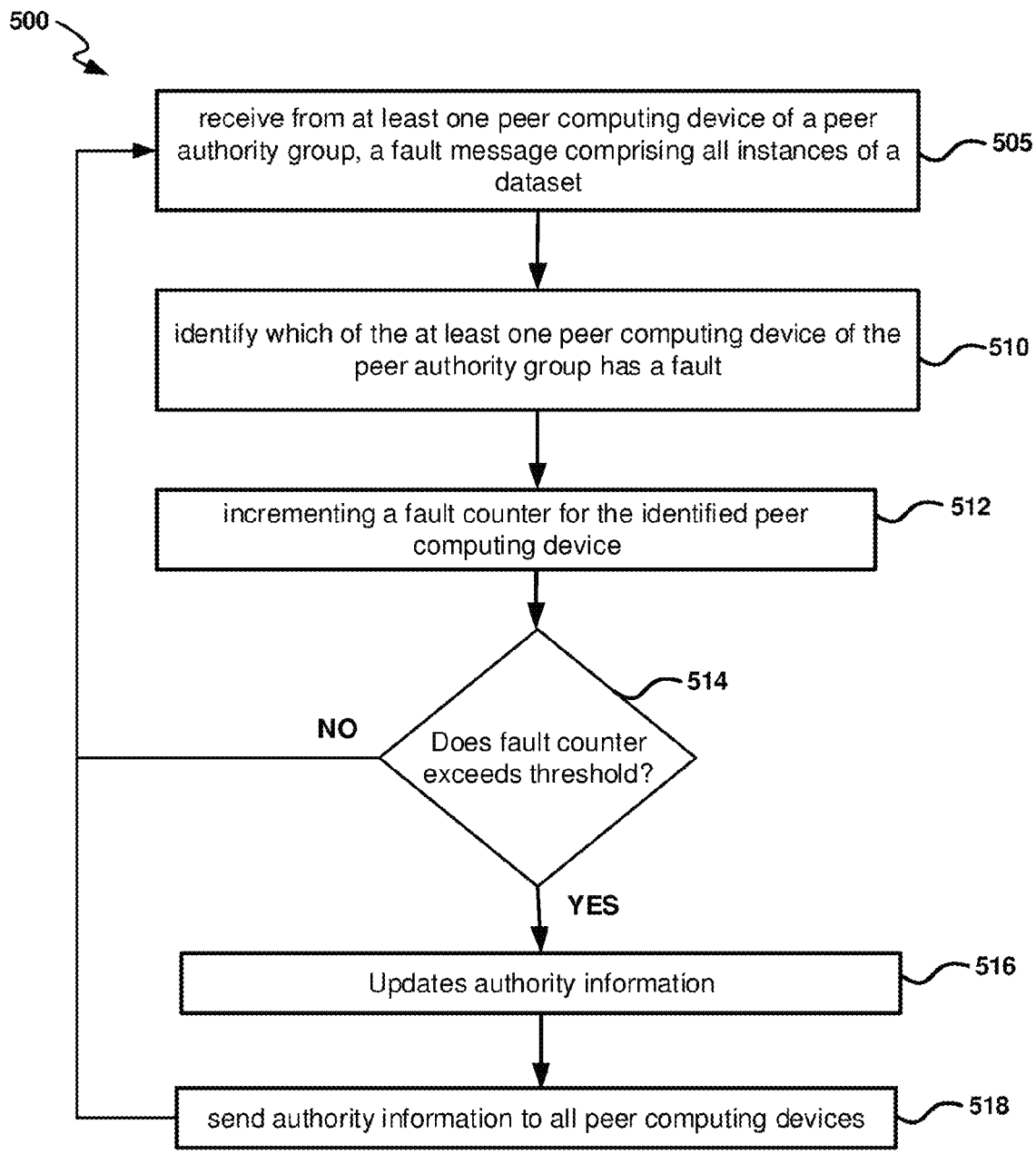
FIG. 5 is a schematic flow diagram of a method of detecting faults at management services in the distributed computing network system of FIG. 1, in accordance with a non-limiting implementation.

Reference is now made to FIG. 5 to describe an example implementation of a method 500 of detecting faults at management services in system 100. Method 500 may be carried out by routines or subroutines of software executed by the processor (not shown) of the management services of system 100. Coding of software for carrying out such steps is well within the scope of a person of ordinary skilled in the art having regard to the present specification. Method 500 may contain additional or fewer processes than shown and described, and may be performed in a different order. Computer-readable code executable by, for example, processor (not shown) of the management services 104 to perform method 500, may be stored in a computer-readable medium.

Regardless, it is to be emphasized, that method 500 of FIG. 5 need not be performed in the exact sequence as shown, unless otherwise indicated; and likewise various blocks may be performed in parallel rather than in sequence; hence the elements of method 500 of FIG. 5 referred to herein as "blocks" rather than "steps Method 500 begins at block 505 where the management services 104 receives, from at least one peer computing device of a peer authority group, a fault message comprising all instances of a dataset. The fault message can be the fault message sent at block 335 of method 300 or the fault message sent at block 435 of method 400. Method 500 then proceeds to block 510.

At block 510, the management services 104 identifies which of the at least one peer computing device of the peer authority group has a fault. Method 500 the proceeds to block 515.

At block 515, a fault counter for the identified peer computing device is incremented and the method 500 proceeds to block 520. At block 520, determination is made as to whether the fault counter exceeds a predetermined threshold number of faults and the method 500 proceed to block 525. The predetermined threshold number of faults is preset by a designer of the application.

At block 525, the management services 104 updates the authority information stored in memory (not shown) to change the authority of the identified peer computing device over the dataset. In other words, the management server reshuffles the peer authority group to remove the identified peer computing device 102 from the peer authority group. Method 500 then proceeds to block 530.

At block 530, the management services 104 sends to all peer computing devices in system 100 the new authority information Method 500 then returns to block 505 to repeat the blocks of method 500 when further fault messages are received.

Figure 6:
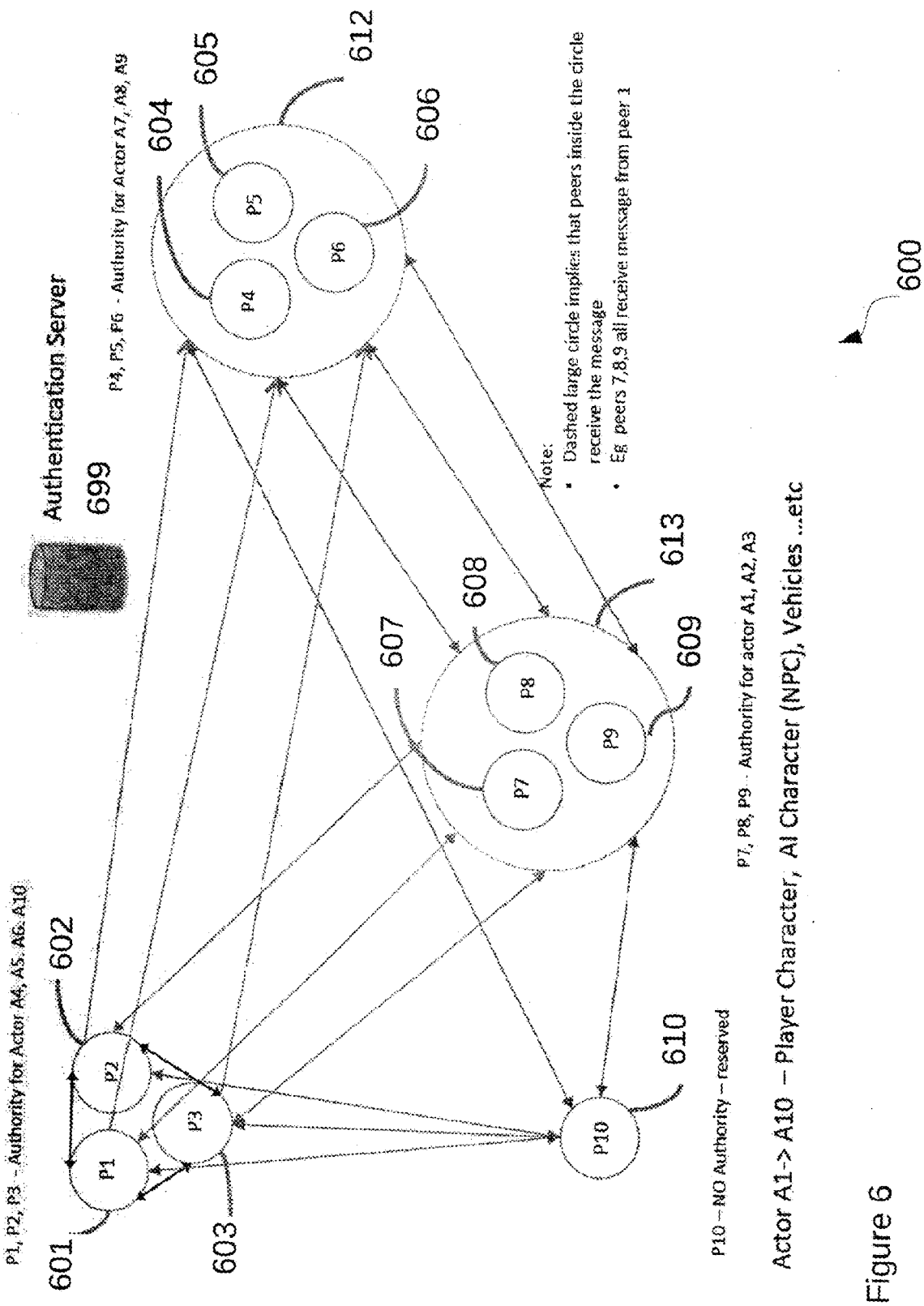
FIG. 6 is a block diagram of a fault-tolerant distributed computing network system running a game application in accordance with another non-limiting implementation.

Referring now to FIG. 6, a block diagram of a distributed computing network system 600 (hereinafter referred to as system 600) according to another non-limiting implementation is shown. System 600 is hosting and executing a game application of a multiplayer game.

System 600 comprises ten peer computing devices 601, 602, 603, 604, 605, 606, 607, 608, 609, 610, and ten game actors A1, A2, A3, A4, A5, A6, A7, A8, A9, and A10. Peer computing devices 601, 602, 603 each have authority overs actors A4, A5, A6, and A10. Peer computing devices 604, 605, and 606, are referred to collectively as peer authority group 612, and each peer computing device 604, 605, and 606 of peer authority group 612 has authority over game actors A7, A8, and A9. Peer computing devices 607, 608, and 609 can be referred to collectively as peer authority group 613, and each peer computing device 607, 608, and 609 of peer authority group 613 has authority over game actors A1, A2, and A3. Peer computing device 610 of system 600 currently has no authority over any game actor, however, peer computing device 610 is capable of acquiring authority. System 600 further comprises management services 699. It will be appreciated that game actors A1 through A10 can represent player actors or artificial intelligence actors in the game.

Each peer computing device 601, 602, 603, 604, 605, 606, 607, 608, 609, 610 maintains the dataset for which it has authority. Each peer computing device 601, 602, 603, 604, 605, 606, 607, 608, 609, 610 maintain its dataset in a memory map that include authority data, non-authority data, and other data. Each peer computing device 601, 602, 603, 604, 605, 606, 607, 608, 609, 610 has authority for multiple actors such that there is multiple authority on system 600. In a preferred implementation, each game actor A1 through A10 has three authorities peers. It will be appreciated that in other implementations, each such a system could work with more than three authorities for each actor. Such a system could also work with any number of authorities for each actor, such as, for example, two authorities.

Each peer computing device 601, 602, 603, 604, 605, 606, 607, 608, 609, 610 in system 600 sends messages to each other peer. Messages are indicated by arrows between peers computing device 601, 602, 603, 604, 605, 606, 607, 608, 609, 610. Each peer computing device 601, 602, 603, 604, 605, 606, 607, 608, 609, 610 sends 9 messages per update, one message for each peer in system 600. A typical update can occur at a rate of about 30 network ticks per second depending on design requirements of the game this can go much higher.

The peer authority groups 612 and 613 are included for ease of understanding, and convey that an arrow pointing toward peer authority groups 612, 613 means that each peer computing device 602 within the peer authority group 612, 613 receives, and can send, the message represented by the arrow. For example, peer computing devices 607, 608, and 609 of peer authority group 613 each send and receive a message to and from peer computing device 601.

Each peer computing device 601, 602, 603, 604, 605, 606, 607, 608, 609, 610 is responsible for updating all the other peers in the system with its authority data. For example, peer computing devices 601, 602, and 603 send updates to other peer computing devices for data pertaining to game actors A4, A5, A6, and A10. If there is an instance where there is conflicting data being reported by peer computing devices 601, 602, and 603 pertaining to game actors A4, A5, A6, or A10 (the actors over which peer computing devices 601, 602, and 603 have authority), peer computing devices 601, 602, and 603 make a decision as to which data is correct.

Management services 699 is responsible for authenticating users and assigning authorities on dataset All major action and errors involving peers in system 600 are reported to management services 699. Discrepancies between data reported by peers with authority can be resolved by these peers, as will become apparent through the description of FIGS. 7-10 below.

The distribution of authority of peer computing devices 601 through 609 over actors in FIG. 6 is illustrated by way of example only. A preferred embodiment, in which peer computing devices are granted authority over actors deterministically, is described below with reference to FIG. 11.

Figure 7:
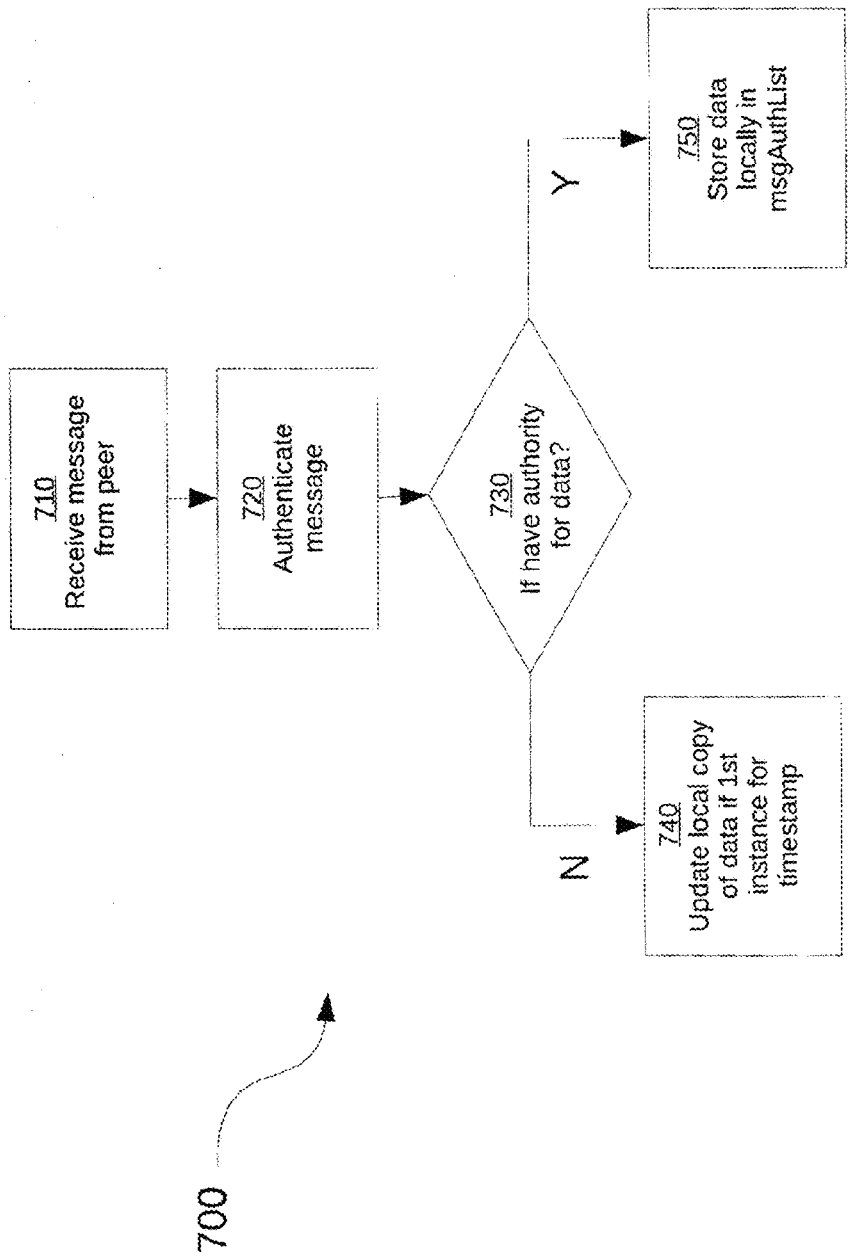
FIG. 7 is a schematic flowchart of a method for authenticating a message received in the fault-tolerant distributed computing network system of FIG. 6.
Figure 8:
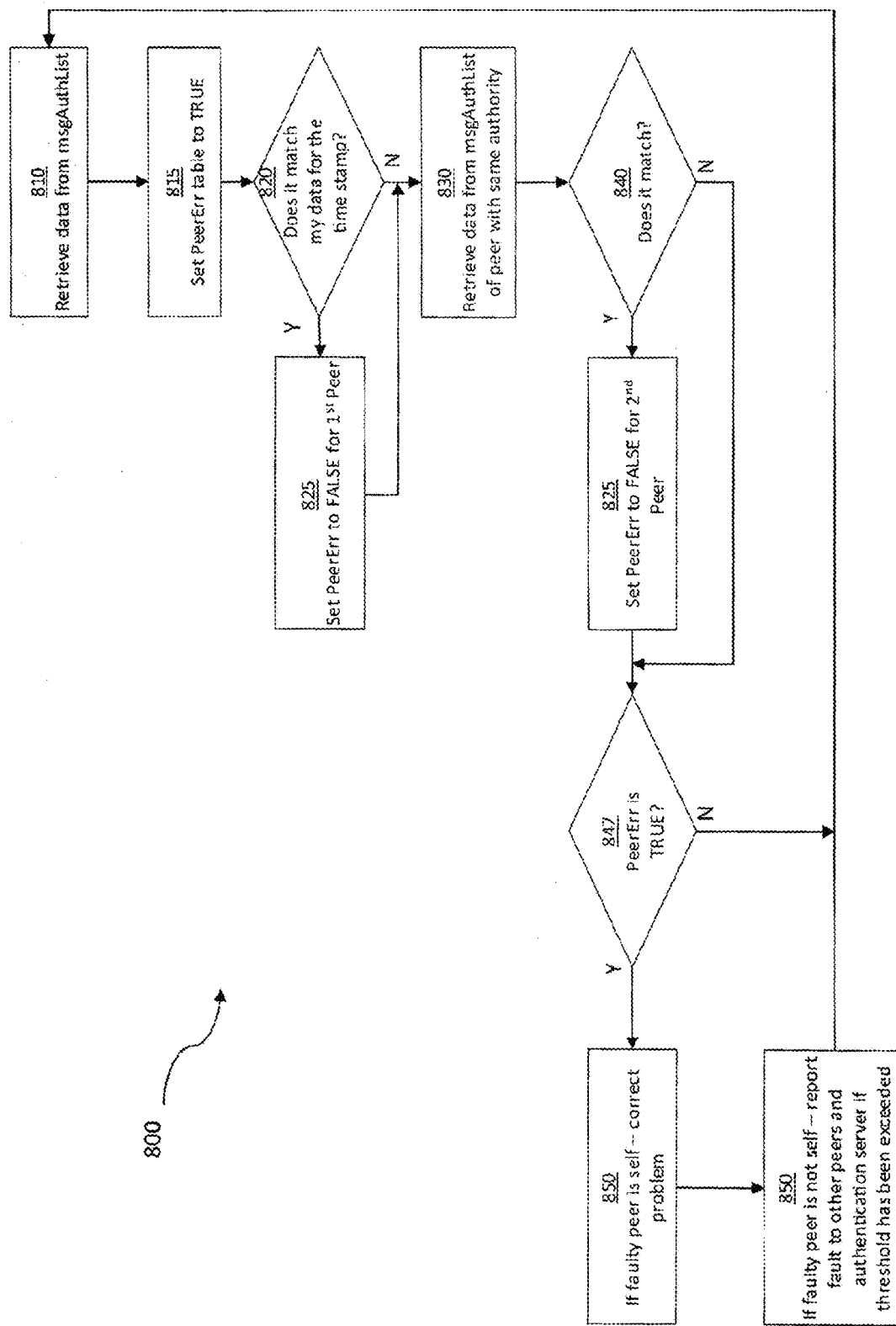

FIG. 7 depicts a schematic flowchart of a method 700 for authenticating a message received in system 600, according to a non-limiting implementation. FIG. 8 depicts a schematic flowchart of a method 800 for analyzing a message received within system 600 according to a non-limiting embodiment. FIGS. 7 and 8 should be reviewed simultaneously with the following description.

Method 700 is one way in which a message can be authenticated system 600. Method 700 begins at block 710.

At block 710, a message is received at a receiving peer from a sending peer. For example, a peer computing device 607 receives a message from peer computing device 608 regarding the health point variable of game actor A1 (where A1 is a player actor controlled by peer computing device 601).

At block 720, the message received at block 710 is authenticated to be from a sending peer with valid authority over the data being sent. Each peer computing device 601, 602, 603, 604, 605, 606, 607, 608, 609, 610 in system 600 stores a table of all peer computing devices in system 600 and their authority. For example, peer computing device 607 checks whether peer computing 608 is an authority for the health point variable of actor A1, which, in this example, it is.

At block 730, the receiving peer computing device determines whether it has authority for the dataset being sent. If the receiving peer computing device does not have authority over the dataset being received, method 700 proceeds to block 740. If the receiving peer computing device has authority over the dataset being received, method proceeds to block 750. In this example, peer computing device 607 confirms that it has authority for the health point variable of A1.

At block 740, if the dataset received is the first instance of the dataset for this timestamp, the local copy on the receiving peer computing device of the dataset being sent is updated. In this example, peer computing device 607 updates its local dataset for A7 with the dataset received from peer computing device 604. In an alternative implementation, at block 740, peer computing device 607 could wait until it receives dataset from all peers in a particular peer authority group (in this case, peers computing device 604, 605, and 606) to arrive before comparing the dataset and choosing a particular t to use.

At block 750, the dataset received is stored in a Message Authority List (not shown) to be retrieved for analysis using method 800.

Method 800 is executed at a receiving peer when the receiving peer computing device receives dataset regarding an actor from an authority when the receiving peer computing device is also an authority for the received dataset.

At block 810, the dataset stored in the Message Authority List at block 750 of method 700 is retrieved. Returning to the health point example, the health point dataset of A1 is retrieved from the Message Authority List.

At block 815, peer error table are set to true and method 800 continues to block 820.

At block 820, the receiving peer computing determines whether the dataset retrieved at block 810 matches the local copy of the authority dataset stored at the receiving peer computing device for the timestamp. If at block 820 there is a match, method 800 proceeds to block 825. Optionally, the receiving peer computing device resets any error count flags that had been previously set. If at block 820 there is not a match, method 800 proceeds to block 830. For example, if the health point variable for actor A1 stored locally at peer computing device 607 does not match the health point variable for actor A1 in the Message Authority List (originally received from peer computing device 608), then method 800 proceeds to block 830.

At block 825, peer error for the receiving peer computing device in block 810 is set to false and method 800 continues to block 830.

At block 830, a dataset is retrieved for the other peer computing device in the Message Authority List with authority over the same dataset. As explained in above with reference to FIG. 6, there are preferably at least two other peers computing devices in system 600 with authorities over the received dataset. In the health point example, peer computing device 609 also has authority over dataset regarding A1, which can also be checked against the dataset regarding A1 received from peer computing device 608.

If, at block 830, data from the Message Authority List is unable to be retrieved, then at some threshold the problem can be reported to management services 699. The threshold could represent, for example, a timer that will expire to indicate that the receiving peer is having connectivity issues or that a message was lost in transmission.

At block 840, a receiving peer computing device determines whether the receiving peer computing device authority dataset matches the authority dataset retrieved at block 830. If the receiving peer's authority data matches the receiving peer's local copy of the authority data for the timestamp, method 800 proceeds to block 845. Otherwise, method 800 proceeds to block 847. In the health point example, the health point dataset for A1 held by peer 607 is compared against the health point dataset for A1 received from peer computing device 608.

At block 845, Peer error flag is set to false for the other peer computing device from block 830.

At Block 847 if any of the peer error flags are true then method 800 proceeds to block 850, otherwise there are no errors and method 800 returns to block 810.

At block 850, the receiving peer computing device determines that it has authority dataset that does not match with the authority dataset of at least two other peers computing device, the receiving peer computing device confirms that the other two peer computing devices datasets (from block 810 and 830) match and has its dataset updated with matching dataset retrieved from block 830. Continuing the example from block 830, the faulty peer computing device 607 is self-corrected. In the health point example, if it is peer computing device 607 that has health point data for A1 that is inconsistent with the same dataset held by peer computing devices 608 and 609, then peer computing device 607 is faulty and is self-corrected.

At block 860, if the receiving peer computing device determines it has authority dataset that does not match with the authority dataset of at least one other peer computing device, an error match count is incremented for the faulty peer. If an error match count threshold is reached, the faulty peer is reported to management services 699. An example error match count threshold could be two error counts. At block 860, management services 699 reports the problem to other peer computing devices, and a reshuffling of dataset authority is initiated.

It should be noted that either a server with management services 699 installed can initiate a reshuffling of the authority mapping, or in system having two peer computing devices with authority for the same dataset can initiate a reshuffle. A reshuffling of dataset authority may be initiated when an error match count exceeds a threshold, or when the number of peer computing devices with authority changes (due to, for example, the loss of a peer computing device due to poor network performance).

A reassignment of authority is initiated by sending a message to all peer computing devices in system 600, which may include instructions to remove a peer computing device from a peer authority group. The decision to remove a peer computing device from a peer authority group may be made at the peer computing device or at management services 699. A method for determining whether to remove a peer computing device from an authority group is by determining whether a threshold of infractions has been exceeded. The threshold of infractions may be overcome by, for example, the expiration of a timer that would indicate a peer has become unresponsive, or a threshold relating to other infractions. An exemplary method for reshuffling authority mapping is shown at FIG. 11. Faulty peer computing devices may be swapped out of authority groupings with reserved peer computing devices, such as peer computing device 610 in system 600.

Figure 9:
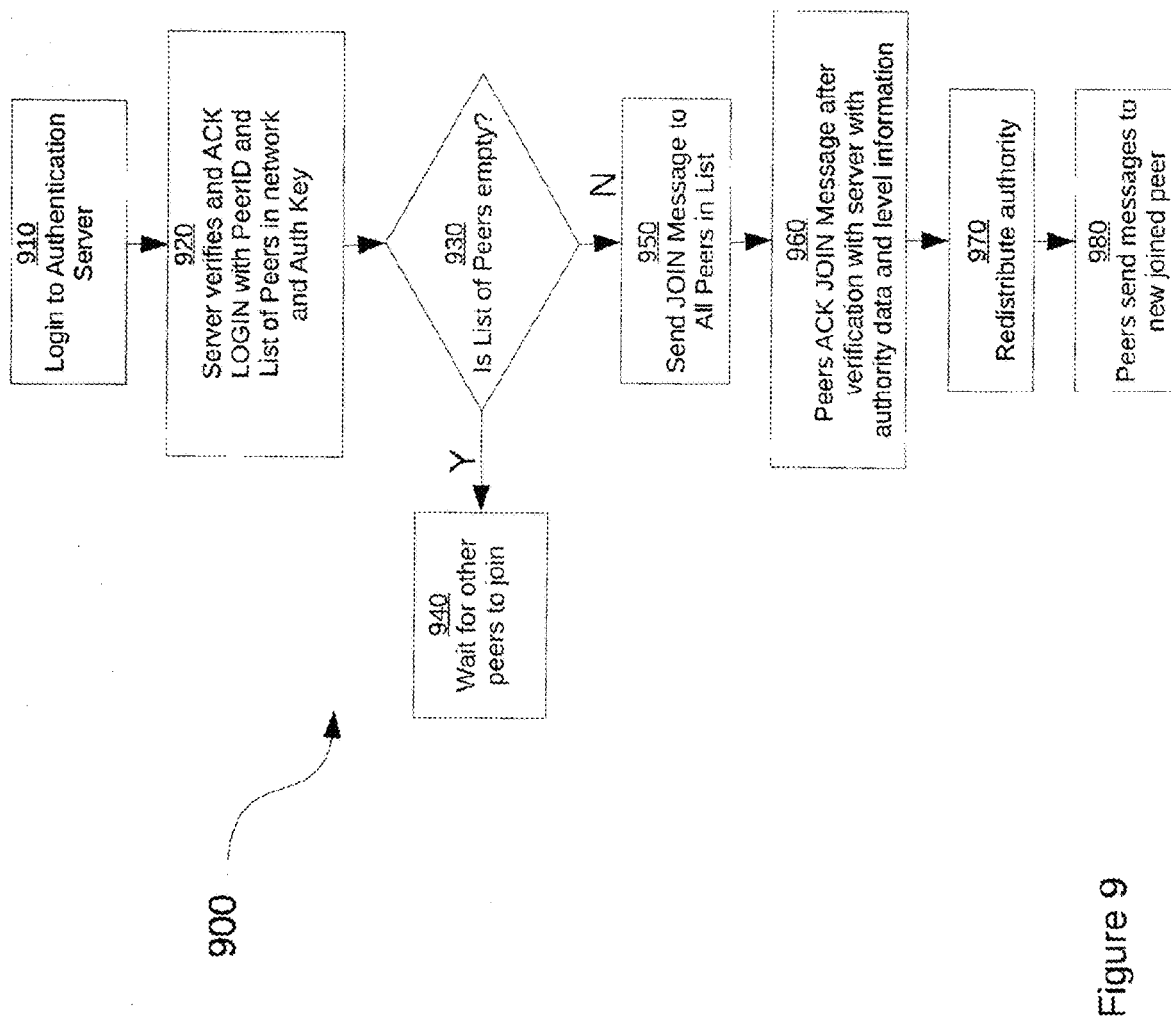
FIG. 9 is a schematic flow diagram of a method for a peer joining the fault-tolerant distributed computing network system in accordance with a non-limiting implementation.

FIG. 9 depicts a method 900 for a peer joining a fault-tolerant distributed computing network system, such as system 100 or 600, according to a non-limiting embodiment.

At block 910, a Joining Peer computing device attempts to login to management services 699.

At block 920, the management services verifies the credentials of the player on the Joining Peer computing device and returns an Acknowledgement Message (ACK), which contains a Peer Identification (PeerID), a list of peer computing devices in system 100 or 600 (peerList), and an Authority Key (AuthKey).

At block 930, it is determined whether the peerList is empty. If the peerList is empty, method 900 proceeds to block 940, otherwise method 900 proceeds to block 950.

At block 940, having determined that the peerList is empty, the Joining peer computing device waits until other peer computing devices join.

At block 950, having determined that the peerList is not empty, the Joining peer computing device sends a Join Request to all current peer computing devices in the peerList.

At block 960, the current peer computing devices receives the Join Request from the Joining peer computing device and verify the Joining peer computing device's PeerID with the management services 104 or 699. The management services responds to the current peer computing devices with an Acknowledgement Message and an Authority Key. The current peer computing devices reply to the Joining peer computing device Join Request with an Acknowledgement Message with current peers' authority datasets and updated level information.

The Authority Key is used to determine authority across the system 100, 600. One method for determining authority across system 100, 600 is the deterministic method described in FIG. 11 below.

At block 970, each peer computing devices creates a map of authority based on the Authority Key.

At block 980, the peer computing devices are ready to begin sending messages updating datasets. In one embodiment, the peer computing devices could follow methods 700 and 800 for sending an updating dataset.

Figure 10:
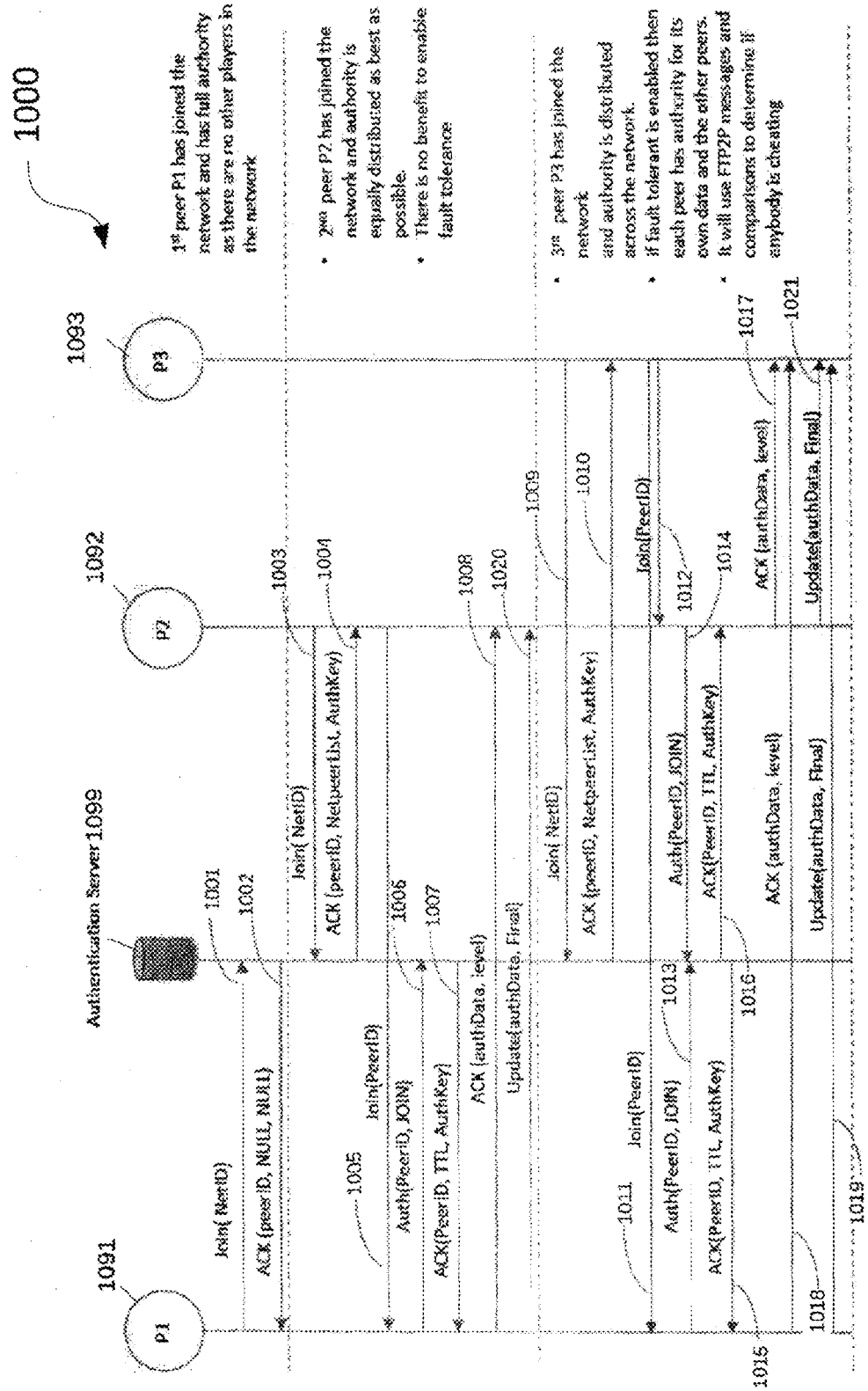
FIG. 10 is a block diagram that illustrates a system for sending messages between an management services and peers seeking to join a fault-tolerant distributed computing network system in accordance with a non-limiting implementation.

FIG. 10 shows a block diagram that illustrates a system 1000 for sending messages between management services and peer computing devices seeking to join a distributed computing network system, according to a non-limiting embodiment. System 1000 comprises three peers computing devices, P1, P2, and P3, and management services 1099. Management services 1099 is responsible for authenticating users and keeping a list of peer computing devices in the distributed computing network system. All major action and errors involving peer computing devices in the distributed computing network system are reported to management services 1099. Peer computing devices who want to join a distributed computing network system would contact management services 1099, and management services would respond with a peer ID, as described previously in FIG. 9. If, for example, a fault occurs with a given peer computing device on the distributed computing network system, the fault is reported to the management services 1099.

System 1000 represents one way in which messages can be sent between three peer computing devices seeking to join a distributed computing network system. The diagram can be read from top to bottom as messages are sent between peer computing devices and the management services 1099, but it is emphasized, however, that the messages of system 1000 need not be sent and received in the exact sequence as shown.

When peer 1091 wishes to join the distributed computing network system, peer computing device 1091 sends a join message 1001 to the management services 1099 containing a Network ID (NetID). In one embodiment, for the creation of a new game, the NetID is set to zero.

When manage 1099 receives message 1001, the management services 1099 responds to peer computing device 1091 with an acknowledgment message 1002 containing a Peer ID only (no Authority Key or List of Peers). The List of Peers computing devices and the Authority Key are both set to NULL indicating that peer computing 1091 is the first peer computing device on the distributed computing network system.

Messages 1001 and 1002 having been sent, peer computing device 1001 has joined the distributed computing network system and currently has full authority over the game dataset since there are no other peer computing device connected to the distributed computing network system.

When peer computing device 1092 wishes to join the distributed computing network system, peer computing device 1092 sends a join message 1003 to the management 1099 containing a Network ID.

When the management services 1099 receives message 1003, the management services 1099 responds to peer 1092 with an acknowledgment message 1004 containing a Peer ID, List of Peers, and Authority Key. The List of Peers (NetpeerList) and Authority Key are no longer NULL, as peer 1091 is already on the network. The Authority Key is set to 2 which indicates to start assignment from the second peer.

When peer computing device 1092 receives the acknowledgment message 1004, peer computing device 1092 sends a join message 1005 to peer 1091 containing the Peer ID for peer computing device 1092.

When peer computing device 1091 receives the join message 1005, peer 1091 sends an authorization message 1006 to the management services 1099 indicating that there is a peer computing device that wants to join the distributed computing network system.

When the management services 1099 receives the authorization message 1006, the management services 1099 sends an acknowledgment message 1007 to peer computing device 1091 authenticating Peer ID for peer computing device 1092, a Time To Live for peer computing device 1092 indicating a duration after which the peerID needs to be reauthenticated, and an Authority Key. The Authority Key provided is the same Authority Key given to peer computing device 1092 in acknowledgment message 1004.

When peer computing device 1091 receives the acknowledgment message 1007, peer 1091 sends an acknowledgment message 1008 to peer computing device 1092 containing any dataset over which it has authority, and any other game dataset. Acknowledgment message 1008 is acknowledging the join message 1005 sent by peer computing device 1092.

Having sent the acknowledgment message 1008, peer computing device 1091 updates peer computing device 1092 with its authorized data and a Final Value in update message 1020. When peer computing device 1091 is completed updating peer computing device 1092, the Final Value in update message 1020 is set to TRUE, which indicates to peer computing device 1092 to recalculate the authority map based on the Authority Key value.

Messages 1003, 1004, 1005, 1006, 1007, 1008, and 1020 having been sent, peer computing device 1092 has joined the network, and authority for game datasets is distributed between peer computing device 1091 and 1092. In one embodiment, authority is distributed deterministically, as discussed in FIG. 11 below. Fault tolerance, however, may not be enabled at this point.

When peer 1093 wishes to join the network, peer computing device 1093 sends a join message 1009 to the management services 1099 containing a Network ID, similar to join message 1003.

Having received join message 1009, the management services sends an acknowledgment message 1010, similar to acknowledgment message 1004. The List of Peers and Authority Key have been populated by peer computing devices 1091 and 1092.

Having received acknowledgment message 1010, peer 1093 sends a join message to every other peer on the network. In the example of FIG. 10, peer 1093 sends a join message 1011 to peer 1091 and a join message 1012 to peer 1092, both messages being similar to join message 1005.

Having received join message 1011 and 1012, peer computing devices 1091 and 1092, respectively, send an authentication message 1013 and 1014, respectively, to the management services 1099. The authentication messages 1013 and 1014 are similar to the authentication message 1006, asking the management services to authenticate peer computing device 1093 with the Peer ID.

Having received authentication messages 1013 and 1014, the management services 1099 sends acknowledgement messages 1015 and 1016 to peer computing devices 1091 and 1092, respectively. The acknowledgment messages 1015 and 1016 are similar to the acknowledgment message 1007, and contains the same Authority Key that was sent to peer computing device 1093 in message 1010.

Having received acknowledgment messages 1015 and 1016, peers computing devices 1091 and 1092, respectively, send acknowledgment messages 1018 and 1017, respectively, each containing the peer computing device's authority dataset and any other game datasets, similar to acknowledgment message 1008.

Having sent the acknowledgment messages 1018, and 1017, peer computing devices 1091 and 1092, respectively, continue to update peer computing device 1093 with their authorized data and a Final Value in update messages 1019 and 1021, respectively. When peer computing devices 1091 and 1092 are completed updating peer computing device 1093, the Final Value in update messages 1019 and 1021 are set to TRUE, which indicates to peer computing devices 1091, 1092, and 1093 to recalculate the authority map based on the Authority Key value.

Messages 1009 through 1021 having been sent, peer computing device 1093 has joined the distributed computing network system, and authority for game data has been distributed across peer computing devices 1001, 1002, and 1003.

FIG. 11 shows an example of authority information stored in memory of management server of a fault tolerant distributed computing system that includes six peers and eight game actors. The authority information is stored as an authority map 1100. Authority map 1100 comprises six peer computing devices, P1, P2, P3, P4, P5, and P6, situated in rows. Authority map 1100 further comprises 12 actors, consisting of 8 player actors AP1, AP2, AP3, AP4, AP5, AP6, AP7, and AP8, and 4 artificial intelligence actors, AI1, AI2, AI3, and AI4, situated in columns. A check mark at a given row and column indicates that the peer of that row has authority over the actor of that column. For example, peer computing device P1 has authority over actor AP2.

In the present implementation, the authority map 1100 is generated such that each actor has three authorities, and such that no peer computing device is responsible for its own actor. For example, actor AP1 is a player actor associated with peer P1, but peer computing devices P4, P5, and P6 have authority over actor AP1. The authority map 1100 can be generated by method 1200, as shown in FIG. 12 below.

Figure 12:
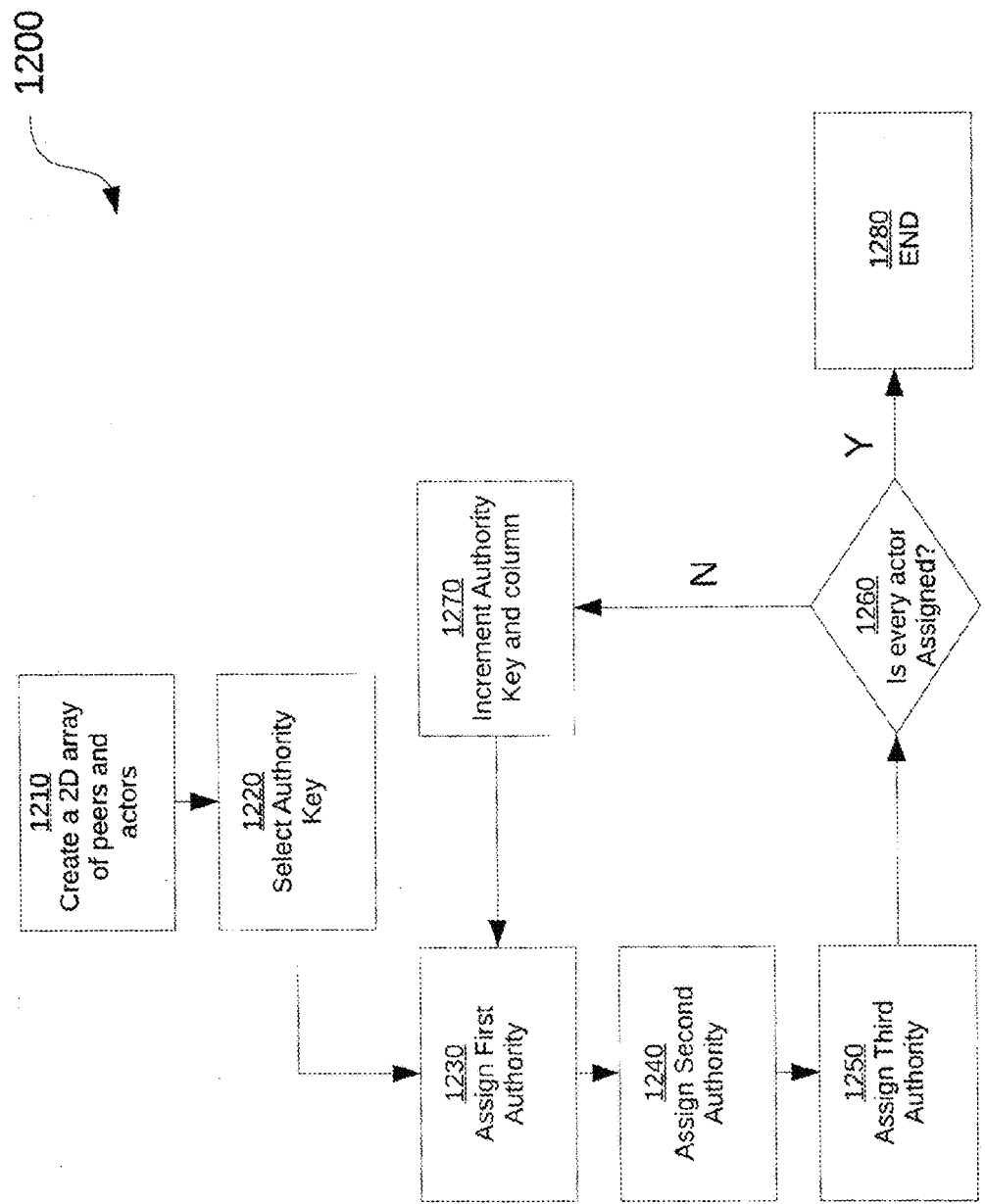
FIG. 12 is a schematic flow diagram of method for generating an authority map for a fault tolerant distributed computing network system in accordance with a non-limiting implementation.

FIG. 12 shows a schematic flow diagram of method 1200 for generating an authority map for a fault tolerant distributed computing network system, such as for example, system 600, according to a non-limiting implementation. Management services of the fault tolerant distributed computing network system performs method 1200. In method 1200, an authority map is generated for system 600 such that each actor has three authorities, and such that no peer 602 is responsible for its own actor, as exemplified by the authority map 1100 in FIG. 11. Method 1200 is an example of one way in which an authority map can be generated for system 600. Method 1200 begins at block 1210.

At block 1210, a two-dimensional array of peer computing devices and actors is generated by management services 604. For example, the two-dimensional array would contain 6 rows and 12 columns. Method 1200 the proceeds to block 1220.

At block 1220, an Authority Key is selected. An Authority Key is the peer number at which a process for assigning authority in system 600 begins. In the embodiment depicted in FIG. 11, for example, the Authority Key is 4. The method then proceeds to block 1230.

At block 1230, a first authority is assigned at the Authority Key row, and in a first column. Referring to the authority map shown in FIG. 11, authority is assigned at row 4, column 1, such that peer P4 is assigned authority over game actor AP1. Method 1200 then proceeds to block 1240.

At block 1240, a second authority is assigned at a next row in the same column. Referring again to the authority map shown in FIG. 11, authority is assigned at row 5, column 1, such that peer P5 is assigned authority over game actor AP1. The method then proceeds to block 1250.

At block 1250, a third authority is assigned at a next row in the same column. For the example in FIG. 11, authority is assigned at row 6, column 1, such that peer P6 is assigned authority over actor AP1.

At block 1260, it is determined whether every actor is assigned authority. If every actor is assigned authority, the authority assignment is complete, and the process ends at block 1280. If every actor is not assigned authority, method 1200 proceeds to block 1270.

At block 1270, an index for the Authority Key and the column number are incremented, and authority can continue being assigned.

Method 1200 is one way in which an authority map can be generated for a fault-tolerant distributed computing network system. Other methods for generating an authority map are also contemplated.

The distributed computing network systems described herein ensure that data in the distributed computing network system is managed by multiple checks of authority, thus maintaining data authority redundancy, and mitigating the effects of data faults and data tampering.

The scope of the claims should not be limited by the implementations set forth in the above examples, but should be given the broadest interpretation consistent with the description as a whole.

What is claimed is:

1. A method for detecting faults in a distributed computing network system hosting and executing an application comprising a plurality of datasets, the distributed computing network system comprising a plurality of peer computing devices and management services, wherein each peer computing device communicates with other peer computing devices in the distributed computing network system via communication links, wherein the plurality of the peer computing devices execute computer-readable instructions of the application, the method comprising:

at a receiving peer computing device of the plurality of peer computing devices of the distributed computing network system:
receiving a message from a sending peer computing device of the plurality of peer computing devices of the distributed computing network system, the message comprising a first copy of a dataset of the plurality of datasets;
authenticating, using authority information, the message to be from a peer computing device having authority over the dataset;
determining, using the authority information, whether the receiving peer computing device has authority over the dataset;
in response to determining that the receiving peer computing device has authority over the dataset, determining whether a mismatch exists among the first copy of the dataset, a second copy of the dataset stored at the receiving peer computing device, and a third copy of the dataset stored at a third peer computing device having authority over the dataset; and
in response to determining that the mismatch exists among the first, second, and third copies of the dataset, performing a correction to the second copy of the dataset or sending, to the management services, a fault message indicating that a fault has been detected at the receiving peer computing device.

2. The method of claim 1, further comprising, in response to determining that the receiving peer computing device has no authority over the dataset, updating the second copy of the dataset with the first copy of the dataset.

3. The method of claim 1, further comprising, in response to determining that the receiving peer computing device has authority over the dataset, storing the first copy of the dataset in a message authority list, the message authority list also comprising the third copy of the dataset.

4. The method of claim 1, wherein determining whether the mismatch exists comprises:
comparing the first copy of the dataset with the second copy of the dataset to generate a first comparison result;
comparing the second copy of the dataset with the third copy of the dataset to generate a second comparison result; and
in response to at least one of the first comparison result or the second comparison result being mismatched, determining that the mismatch exists.

5. The method of claim 4, wherein determining whether the mismatch exists further comprises comparing the first copy of the dataset with the third copy of dataset to generate a third comparison result, and wherein performing the correction to the second copy of the dataset further comprises:
in response to the third comparison result being matched and both of the first comparison result and the second comparison result are mismatched, correcting the second copy of the dataset with the first copy of the dataset or the third copy of the dataset.

6. The method of claim 4, wherein, in response to one of the first comparison result or the second comparison result being mismatched, incrementing an error match count, and wherein sending the fault message further comprises:
in response to the error match count reaching a predetermined threshold, sending, to the management services, the fault message indicating that the fault has been detected at the receiving peer computing device.

7. The method of claim 6, wherein, in response to the management services receiving the fault message, a reshuffling of the authority information is initiated by the management services.

8. The method of claim 1, wherein the authority information is stored in each of the plurality of peer computing devices of the distributed computing network system.

9. A distributed computing network system hosting and executing an application comprising a plurality of datasets, the distributed computing network system comprising a plurality of peer computing devices and management services,
wherein each peer computing device communicates with other peer computing devices in the distributed computing network system via communication links,
wherein the plurality of the peer computing devices execute computer-readable instructions of the application,
wherein the plurality of peer computing devices comprises a first peer computing device, a second peer computing device, and a third peer computing device, and
wherein the second peer computing device is adapted to:
receive a message from the first peer computing device, the message comprising a first copy of a dataset of the plurality of datasets;
authenticate, using authority information, the message to be from a peer computing device having authority over the dataset;
determine, using the authority information, whether the second peer computing device has authority over the dataset;
in response to determining that the second peer computing device has authority over the dataset, determine whether a mismatch exists among the first copy of the dataset, a second copy of the dataset stored at the second peer computing device, and a third copy of the dataset stored at the third peer computing device having authority over the dataset; and
in response to determining that the mismatch exists among the first, second, and third copies of the dataset, perform a correction to the second copy of the dataset or send, to the management services, a fault message indicating that a fault has been detected at the second peer computing device.

10. The system of claim 9, wherein the second peer computing device is further adapted to, in response to determining that the second peer computing device has no authority over the dataset, update the second copy of the dataset with the first copy of the dataset.

11. The system of claim 9, wherein the second peer computing device is further adapted to, in response to determining that the second peer computing device has authority over the dataset, store the first copy of the dataset in a message authority list, the message authority list also comprising the third copy of the dataset.

12. The system of claim 9, wherein the second peer computing device is further adapted to determine the mismatch exists by:
   comparing the first copy of the dataset with the second copy of the dataset to generate a first comparison result;
   comparing the second copy of the dataset with the third copy of the dataset to generate a second comparison result; and
   determining that at least one of the first comparison result or the second comparison result is mismatched.

13. The system of claim 12, wherein the second peer computing device is further adapted to determine the mismatch exists by comparing the first copy of the dataset with the third copy of dataset to generate a third comparison result, and wherein the second peer computing device is further adapted to, in response to the third comparison result being matched and both of the first comparison result and the second comparison result are mismatched, perform the correction to the second copy of the dataset with the first copy of the dataset or the third copy of the dataset.

14. The system of claim 12, wherein the second peer computing device is further adapted to, in response to one of the first comparison result or the second comparison result being mismatched, increment an error match count, and wherein the second peer computing device is further adapted to, in response to the error match count reaching a predetermined threshold, send, to the management services, the fault message indicating that the fault has been detected at the second peer computing device.

15. The system of claim 14, wherein the management services are adapted to initiate a reshuffling of the authority information upon receiving the fault message.

16. The system of claim 9, wherein the authority information is stored in each of the plurality of peer computing devices of the distributed computing network system.

* * * * *